United States Patent
Shanmugavadivel et al.

(10) Patent No.: US 8,392,990 B2
(45) Date of Patent: Mar. 5, 2013

(54) MITIGATING EXCESSIVE OPERATIONS ATTACKS IN A WIRELESS COMMUNICATION NETWORK

(75) Inventors: Snthilraj Shanmugavadivel, Tamil Nadu (IN); Vinodh Kumar, Tamil Nadu (IN); Srinvasan K. Thirukonda, Karnataka (IN)

(73) Assignee: Symbol Technologies, Inc., Holtsville, NY (US)

( * ) Notice: Subject to any disclaimer, the term of this patent is extended or adjusted under 35 U.S.C. 154(b) by 295 days.

(21) Appl. No.: 12/824,928

(22) Filed: Jun. 28, 2010

(65) Prior Publication Data
US 2011/0321161 A1   Dec. 29, 2011

(51) Int. Cl.
*H04L 29/06* (2006.01)
(52) U.S. Cl. .................................................. 726/22
(58) Field of Classification Search .................. 726/22
See application file for complete search history.

(56) References Cited

U.S. PATENT DOCUMENTS

| | | | |
|---|---|---|---|
| 7,043,561 B2* | 5/2006 | Hosomi | 709/235 |
| 7,926,103 B2* | 4/2011 | Aguilera et al. | 726/22 |
| 2007/0022474 A1* | 1/2007 | Rowett et al. | 726/11 |
| 2009/0019539 A1* | 1/2009 | Jonnalagadda et al. | 726/14 |
| 2010/0146272 A1* | 6/2010 | Centonza et al. | 713/168 |
| 2011/0010771 A1* | 1/2011 | Olfat et al. | 726/22 |
| 2011/0019547 A1* | 1/2011 | De Lutiis et al. | 370/231 |
| 2011/0099623 A1* | 4/2011 | Garrard et al. | 726/14 |

* cited by examiner

*Primary Examiner* — Jeffrey Pwu
*Assistant Examiner* — William Corum, Jr.
(74) *Attorney, Agent, or Firm* — Brian M. Mancini

(57) ABSTRACT

A technique for mitigating excessive operations attacks in a wireless communication network includes receiving message requests from stations, detecting an excessive operation attack, checking if a received request is a first request or a retry request, and ignoring any first requests. The method can also include saving information about the first request, and wherein if checking reveals that the received request is a retry request, the method further confirms that the retry request and the saved information about the first request meet matching conditions, whereupon the retry request is further processed as normal. Since attacks rarely utilize retry requests, this technique effectively ignores attack messages.

17 Claims, 2 Drawing Sheets

MITIGATING EXCESSIVE OPERATIONS ATTACKS IN A WIRELESS COMMUNICATION NETWORK

FIELD OF THE DISCLOSURE

The present invention relates generally to wireless communication networks and more particularly to excessive operations attacks in a wireless communication network.

BACKGROUND

At present, communications networks are being exposed to various forms of attack, seeking to block access to, or bring down, particular nodes, entities, or sites in the communication network. These are commonly known as Excessive Operations attacks in either wired (Internet) or wireless networks, wherein a large number of short, concurrent messages are sent to a particular network node. Consequently, the node is hit with a flood of messages within a very short time period. However, the node is unable to process or respond to all these messages in this short time period causing a denial-of-service (DoS). As a result, communications with the node may collapse completely, i.e. the node crashes, stops beaconing, disadopts from its network switch, or at the very least the flood of unauthorized messages serves to block legitimate users from accessing the node.

One solution to these attacks is to "blacklist" the Stations that are causing these excessive operations. However, memory capacity is an obvious issue here. In addition, this solution is not scalable since an offender can create millions of Authentication requests very quickly by rotating source Media Access Control (MAC) addresses using the whole range of available MAC addresses.

Accordingly, there is a need to mitigate the detrimental effects of the above described Excessive Operations attacks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
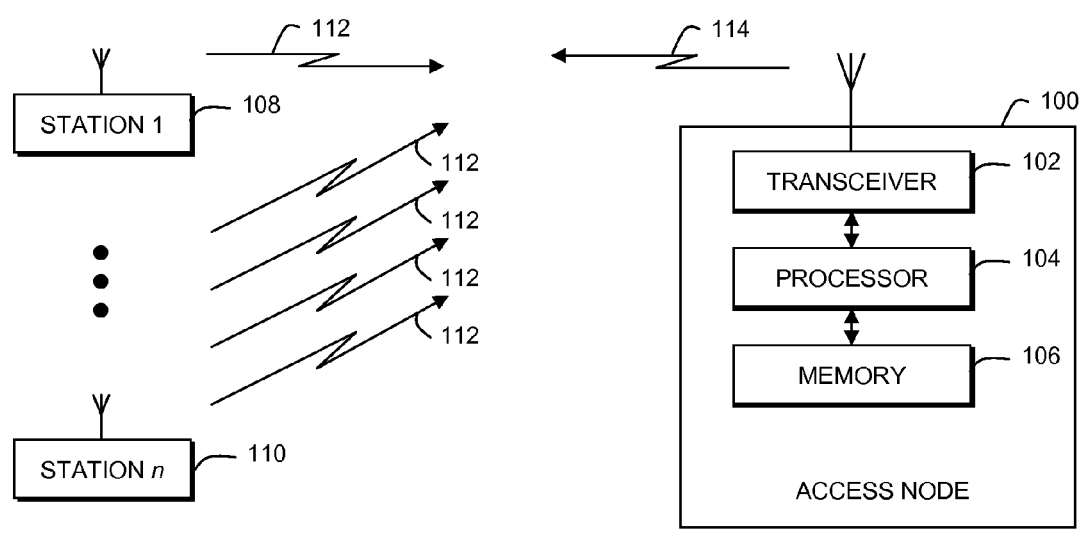
FIG. 1 is a block diagram of a system, in accordance with the present invention.
Figure 2:
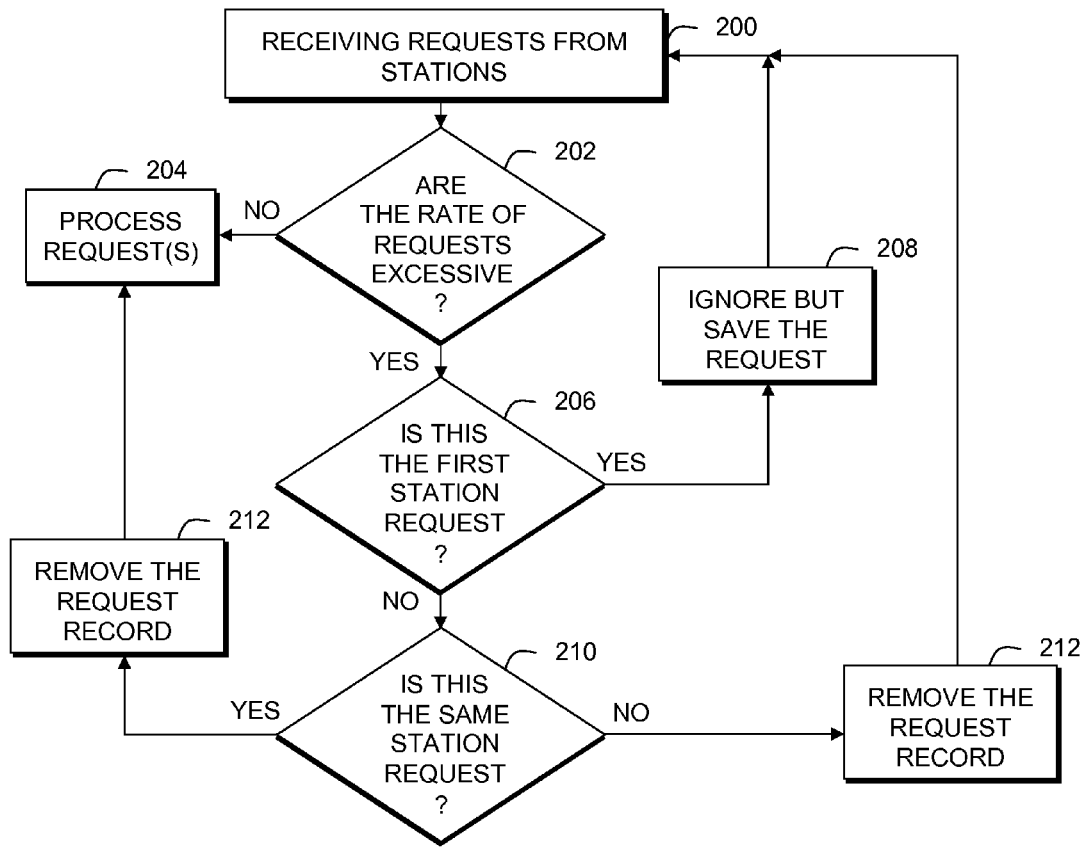
FIG. 2 is a flowchart of a method, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention mitigates the effect of Excessive Operations attacks. In particular, the present invention provides a technique to selectively acknowledge messages to an access node when an Excessive Operations attack is detected. Further, the present invention, can also mitigate spoofed de-authentication and association packets, and can also validate a (re)association spoof in a IEEE 802.11w network, while also preventing a wireless network switch from sending SA queries unnecessarily.

FIG. 1 is a block diagram depiction of a wireless communication network, such as a wireless wide-area network (WWAN) or other IEEE 802.11 wireless communication system. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless technologies. For example, the description that follows can apply to an access network that is IEEE 802.xx-based, employing wireless technologies such as IEEE's 802.11, 802.16, or 802.20, modified to implement embodiments of the present invention.

Referring to FIG. 1, there is shown a block diagram of an access node (AN) 100 adapted to support the inventive concepts of the preferred embodiments of the present invention. Those skilled in the art will recognize that FIG. 1 does not depict all of the network equipment necessary for system to operate but only those system components and logical entities particularly relevant to the description of embodiments herein. For example, an access node, eNodeB, or base station can be connected with or comprise one or more devices such as wireless area network stations (which include access points (APs), Media Access Controllers (MAC), AP controllers, and/or switches), base transceiver stations (BTSs), base site controllers (BSCs), packet control functions (PCFs), packet control units (PCUs), and/or radio network controllers (RNCs). However, none of these other devices are specifically shown in FIG. 1.

AN 100 is depicted in FIG. 1 as comprising a processor 104 coupled to a transceiver 102 and memory 106. In general, components such as processors, memories, and transceivers are well-known. For example, AN processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement an AN processor that performs the given logic. Therefore, AN 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AN aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

The AN 100 uses a wireless interface for communication with multiple user equipment or user stations (Station 1 . . . . Station n) 108-110. The wireless interface correspond to a forward link and a reverse link used in the implementation of various embodiments of the present invention. Stations or remote unit platforms are known to refer to a wide variety of consumer electronic platforms such as mobile stations, mobile units, mobile nodes, user equipment, subscriber equipment, subscriber stations, access terminals, remote terminals, terminal equipment, gaming devices, personal computers, and personal digital assistants, and the like, all referred to herein as Stations. In particular, each Station 108-110 comprises a processor that can be coupled to a transceiver, antenna, a keypad, a speaker, a microphone, and a display, as are known in the art and therefore not shown.

Stations are known to comprise basic components such as, but not limited to, microprocessors, digital signal processors (DSPs), microcontrollers, memory devices, application-specific integrated circuits, and/or logic circuitry. Such Stations are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Referring back to FIG. 1, the processor 104 of the Access Node (AN) 100 receives requests 112 via its transceiver 102 from a plurality of Stations 108-110. In an Excessive Operations attack, the great majority of these requests 112 are from unassociated or unauthorized stations, e.g. Station 2 through n 110. However, even normal communications from authorized and associated stations, such as Station 1 108, can be sending requests 112 to the AN 110, thereby further contributing to the traffic. These requests 112 are messages that typically include one or more packets in a management frame that indicate requests for any one or more of; probes, authorizations, de-authorizations, association requests, dissociation frames, and the like.

The AN processor 104 detects whether the AN is experiencing an excessive operation attack from all the station requests 112 and enters a selective acknowledgement mode, as will be details below. In particular, the AN processor 104 determines whether the number of requests received within a particular excessive operations detection window (i.e. the rate of requests) exceeds a threshold. Preferably, the threshold can be changed dynamically dependent on network conditions. For example, the AN processor 104 can change the length of the excessive operations (ex-op) detection window and/or change the number of requests that trigger the selective acknowledgement condition. If the AN processor 104 determines that it is not experiencing an attack, it will process the requests normally, by sending an acknowledgement (ACK) 114 and processing the received management frames as is known in the art.

If the AN processor 104 detects an attack, it will check to see if a received request 112 is the first request (i.e. an initial) received from a particular station. This can be done by checking a retry bit of the request, i.e. a bit reserved in a header of a valid management frame of the request message that indicates if this request to the AN 100 is being "retried" after sending a previous identical request. If the retry bit is not set, the AN processor 104 will simply ignore this first request (by not sending an acknowledgement). However, the AN processor 104 will still record information about the request 112 in its memory 106, including one or more of; the source MAC address in a header of the management frame of the request (indicating the identity of the request source), the particular type of request (e.g. probe, authorizations, de-authorizations, association requests, dissociation frames, etc.) of a management packet of the management frame, a time stamp in the management frame, and a sequence number in a header of the request that identifies the frame correctly.

If the retry bit is set, indicating that request 112 has been tried once before. The AN processor 104 confirms that this retry request is actually the same request as before. This is done by the AN processor 104 reading the MAC address of the retry request 112 and comparing it to the previously-stored record in memory 106 from the first request 112 from this same MAC address. The AN processor 104 will compare the retry request parameters against the record in memory 106 to see if they meet matching conditions. These matching conditions include; the source MAC address of the retry request and of the record being the same, the particular type of retry request matching the type of the recorded first request, a time stamp of the retry request being within a pre-determined excessive operations (ex-op) time interval of the time stamp of the first request, and a sequence number of the retry request and recorded first request being the same. It should be noted that the ex-op time interval (e.g. ten microseconds) can be dynamically changed in response to network conditions.

If the matching conditions are met, then the record is removed from memory 106, and the retry request 112 is process normally, by the processor 104 directing the transceiver 102 to send an acknowledgement (ACK) 114, and further processing as is known in the art. However, if there is no record in memory 106 (i.e. the retry source never made a previous request) or if all the matching conditions are not met, the record is removed from memory 106, and the request 112 is ignored. Optionally, the AN processor 104 can check its record in memory 106, and if any records have a time stamp that is older than the ex-op time interval, that record can be removed from memory 106.

In operation, the present invention detects whether a wireless management frame is received from a valid Station or from a un-authorized client or fake client. Fake clients are not valid, physical Stations. This type of client can be created in thousands using known spoofing tools. However, these tools typically do not or can not retry the wireless management frame if an ACK is not received for the frame that it has already sent. This failure allows the operation of the present invention. Valid clients are actual Stations that are physically present. Valid clients are the ones that would retry a wireless management frame if an ACK is not received for a valid frame that it had already sent, in accordance with network protocols.

FIG. 3 illustrates a flowchart of a method to mitigate Excessive operations attacks in a wireless communication network by selective acknowledgement, in accordance with the present invention.

The method starts by the AN receiving 200 message requests from stations. In an Excessive Operations attack, the great majority of these requests are from unassociated or unauthorized stations. However, even normal communications from authorized and associated stations can be sending requests to the AN, thereby further contributing to the traffic. These requests are messages that typically include one or more packets in a management frame that indicate requests for any one or more of; probes, authorizations, de-authorizations, association requests, dissociation frames, and the like.

The AN proceeds by detecting 202 whether the AN is experiencing an excessive operation attack from all the station requests. In particular, the AN determines whether the number of requests received within a particular excessive operations detection window (i.e. the rate of requests) exceeds a threshold. Preferably, the threshold can be changed dynamically dependent on network conditions. For example, the AN can change the length of the excessive operations (ex-op) detection window and/or change the number of requests that trigger the selective acknowledgement condition. If the AN determines that it is not experiencing an attack, it will process 204 the requests normally, by sending an acknowledgement (ACK), and further processing as is known in the art.

If the AN detects an attack, the AN will check 206 to see if a received request is the first request received from a particular station. This can be done by checking a retry bit of the request, i.e. a bit reserved in a header of a valid management frame of the request message that indicates if this request to the AN is being "retried" after sending a previous identical request. If the answer is Yes (this is a first request), the AN will simply ignore 208 this first request. However, the AN will still record 208 information about the request, including one or more of; the source MAC address in a header of the management frame of the request (indicating the identity of the request source), the particular type of request (e.g. probe, authorizations, de-authorizations, association requests, dissociation frames, etc.) of a management packet of the management frame, a time stamp in the management frame, and a sequence number in a header of the request that identifies the frame correctly.

If the retry bit is set, indicating that request has been tried once before. The AN confirms 210 that this retry request is actually the same request as before. This is done by the AN reading the MAC address of the retry request and comparing it to the previously-stored record from the first request from this same MAC address. The AN will compare the retry request parameters against the record to see if they meet matching conditions. These matching conditions include; the source MAC address of the retry request and of the record being the same, the particular type of retry request matching the type of the recorded first request, a time stamp of the retry request being within the ex-op time interval of the time stamp of the first request, and a sequence number of the retry request and recorded first request being the same. It should be noted that the ex-op time interval can be dynamically changed in response to network conditions.

If the matching conditions are met, then the record is removed 212, and the retry request is process 204 normally, by sending an acknowledgement (ACK), and further processing as is known in the art. However, if there is no record (i.e. the retry source never made a previous request) or if all the matching conditions are not met, the record is removed 212 and the request is ignored. Optionally, the AN can check its records, and if any records have a time stamp that is older than the ex-op time interval, that record can be removed 212.

Advantageously, the present invention mitigates the effect of an Excessive Operations attack on an access node by providing a novel selective acknowledgement technique when an Excessive Operations attack is detected. This technique reduces messaging overhead, and reduces required memory over the previous solution. Further, the same technique of present invention mitigates spoofed de-authentication and association packets, and can also validate a (re)association spoof in a IEEE 802.11w network, while also preventing a wireless network switch from sending spoof attack queries unnecessarily.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to mitigate excessive operations attacks in a wireless communication network, the method comprising:
receiving message requests at an access node in wireless management frames from stations;
detecting a number of short, concurrent message requests in wireless management frames causing a denial-of-service attack, whereupon;
checking if a received request has a retry bit that is set and that the request is the same as a previous request, whereupon the access node accepts the request; and
ignoring and storing any requests having a retry bit that is not set.

2. The method of claim 1, further comprising retrying a wireless management frame if an acknowledgement is not received for a valid frame.

3. The method of claim 1, wherein ignoring includes saving information about the first request, and wherein if checking reveals that the received request is a retry request, further comprising confirming that the retry request and the saved information about the first request meet matching conditions between the first request and retry request, whereupon further processing the retry request.

4. The method of claim 3, wherein saving includes recording at least a MAC address and a sequence number of the first request, and confirming includes confirming that a MAC address of the retry request is the same as the MAC address of the recorded information, and confirming that a sequence number of the retry request is the same as the sequence number of the recorded information.

5. The method of claim 4, wherein saving includes recording a time stamp of the first request, and confirming includes confirming that a difference between a time stamp of the retry request and the time stamp of the recorded information is within a predetermined time interval.

6. The method of claim 4, wherein saving includes recording a request-type of the first request, and confirming includes confirming that a request-type of the retry request is the same as the request-type of the recorded information, wherein the request-type is one of the group of an authorization, and an association request.

7. The method of claim 3, wherein confirming includes removing the saved information about the first request.

8. The method of claim 1, wherein ignoring includes ignoring any retry requests if there is no recorded information from a corresponding first request.

9. The method of claim 1, wherein detecting includes detecting whether the rate of requests exceeds a predetermined threshold.

10. An access node, comprising:
a transceiver operable to receive message requests in wireless management frames from stations; and
a processor coupled to the transceiver, the processor operable for detecting a number of short, concurrent message requests causing a denial-of-service attack, check if a received request has a retry bit that is set and that the request is the same as a previous request, whereupon the access node accepts the request, and ignoring and storing any requests having a retry bit that is not set.

11. The access node of claim 10, further comprising a memory coupled to the processor, wherein the processor is also operable to record information about the first request in the memory, and wherein if the received request is a retry request, the processor is further operable to confirm that the retry request and the saved information about the first request meet matching conditions, whereupon the processor will further process the retry request.

12. The access node of claim 11, wherein the information includes at least a MAC address and a sequence number of the first request, and the processor can confirm that a MAC address of the retry request is the same as the MAC address of the recorded information, and confirm that a sequence number of the retry request is the same as the sequence number of the recorded information.

13. The access node of claim 12, wherein the information also includes a time stamp of the first request, and the processor can confirm that a difference between a time stamp of the retry request and the time stamp of the recorded information is within a predetermined time interval.

14. The access node of claim 12, wherein the information also includes a request-type of the first request, and the processor can confirm that a request-type of the retry request is the same as the request-type of the recorded information, wherein the request-type is one of the group of an authorization, and an association request.

15. The access node of claim 10, wherein the processor can ignore any retry requests if there is no recorded information from a corresponding first request.

16. The access node of claim 10, wherein the processor is further operable to detect whether the rate of requests exceeds a predetermined threshold.

17. A method to mitigate excessive operations attacks in a wireless communication network, the method comprising:
receiving message requests at an access node in wireless management frames from stations;
detecting a number of short, concurrent message requests in wireless management frames causing a denial-of-service attack;
checking if a received request has a retry bit that is set and that the request is the same as a previous request, whereupon the access node accepts the request; wherein if the received request has a retry bit that is not set, ignoring the first request and saving information about the first request, and if the received request has a retry bit that is set, confirming that the retry request and the saved information about the first request meet matching conditions, whereupon further processing the retry request.

* * * * *

UNITED STATES PATENT AND TRADEMARK OFFICE
CERTIFICATE OF CORRECTION

| | | |
|---|---|---|
| PATENT NO. | : 8,392,990 B2 | Page 1 of 1 |
| APPLICATION NO. | : 12/824928 | |
| DATED | : March 5, 2013 | |
| INVENTOR(S) | : Shanmugavadivel et al. | |

It is certified that error appears in the above-identified patent and that said Letters Patent is hereby corrected as shown below:

On the Title Page, Item (75), under "Inventors", in Column 1, Line 1, delete "Snthilraj" and insert -- Senthilraj --, therefor.

Signed and Sealed this
Eighteenth Day of November, 2014

Michelle K. Lee
*Deputy Director of the United States Patent and Trademark Office*